United States Patent
Panchaksharaiah et al.

(10) Patent No.: US 11,432,047 B1
(45) Date of Patent: Aug. 30, 2022

(54) SYSTEMS AND METHODS FOR SELECTIVELY AND AUTOMATICALLY ENABLING AND DISABLING FEATURES OF A CHAT APPLICATION

(71) Applicant: Rovi Guides, Inc., San Jose, CA (US)

(72) Inventors: Vishwas Sharadanagar Panchaksharaiah, Karnataka (IN); Vikram Makam Gupta, Karnataka (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/518,795

(22) Filed: Nov. 4, 2021

(51) Int. Cl.
| | |
|---|---|
| *H04N 21/4788* | (2011.01) |
| *H04N 21/45* | (2011.01) |
| *H04L 51/00* | (2022.01) |
| *H04N 21/472* | (2011.01) |
| *H04N 21/442* | (2011.01) |
| *H04N 21/454* | (2011.01) |

(52) U.S. Cl.
CPC ......... *H04N 21/4788* (2013.01); *H04L 51/12* (2013.01); *H04N 21/44218* (2013.01); *H04N 21/454* (2013.01); *H04N 21/4532* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 6,081,831 A * | 6/2000 | Miura | ................... | G06F 40/109 709/206 |
| 7,036,083 B1 * | 4/2006 | Zenith | ................ | H04N 21/4782 348/E7.071 |
| 7,221,387 B2 * | 5/2007 | Fernandez | ......... | H04N 21/4786 348/E7.071 |
| 8,561,118 B2 * | 10/2013 | Flynn-Ripley | ........ | H04L 61/605 709/204 |
| 9,071,897 B1 * | 6/2015 | Johnston | .................. | H04R 5/02 |
| 9,693,019 B1 * | 6/2017 | Fluhr | ...................... | G06F 3/165 |
| 2005/0132420 A1 * | 6/2005 | Howard | .................. | G06F 3/017 348/E5.103 |
| 2005/0262542 A1 * | 11/2005 | DeWeese | ........... | H04N 7/17318 348/E7.071 |
| 2011/0173675 A9 * | 7/2011 | Griffin | .................... | G06F 21/56 726/3 |
| 2014/0101706 A1 * | 4/2014 | Kardatzke | .......... | H04N 21/4622 725/86 |
| 2016/0330160 A1 * | 11/2016 | Shan | ....................... | H04L 51/32 |
| 2018/0198636 A1 * | 7/2018 | Paluch | ................ | H04L 12/1818 |

* cited by examiner

*Primary Examiner* — Alexander Q Huerta
(74) *Attorney, Agent, or Firm* — Haley Guiliano LLP

(57) ABSTRACT

Each user in a group watch session is identified, as is a media asset being consumed by the users. The media asset comprises a plurality of segments, and an availability level of each user is determined for each segment of the media asset. If the availability level of the user for a given segment is below a threshold level, at least one function of a chat application is disabled on a device associated with the user for at least the duration of the segment. If the availability level of the user for a given segment meets or exceeds the threshold level, including when the availability level rises to or above the threshold level after having been below the threshold level, the at least one function of the chat application is enabled or reenabled.

20 Claims, 10 Drawing Sheets

1100

1102 Monitor the presence of the $U^{th}$ user during consumption of the media asset

1104 $N = 1$; $C_s$ = number of segments consumed; $T$ = number of segments to which the user paid attention

1106 Was the $U^{th}$ user paying attention to the media asset during consumption of the $N^{th}$ segment?

1108 $T = T+1$

1110 $N = C_s$?

1112 $N = N+1$

1114 Calculate engagement score for the $U^{th}$ user based on the value of T

1202 Receive a message intended for delivery to the $U^{th}$ user

1204 Is the content of the message below a substantiveness threshold?

1206 Allow delivery of the message to the $U^{th}$ user

1208 Prevent delivery of the message to the $U^{th}$ user

FIG. 12

SYSTEMS AND METHODS FOR SELECTIVELY AND AUTOMATICALLY ENABLING AND DISABLING FEATURES OF A CHAT APPLICATION

BACKGROUND

This disclosure is directed to selectively and automatically enabling and disabling features of a chat application. In particular, techniques are disclosed for enabling and disabling features of a chat application during a group watch session.

SUMMARY

As over-the-top (OTT) streaming services gain in popularity, users have group watch sessions or "watch parties" in which a number of users watch the same content at the same time on their own devices and in locations of their choosing. To further the social nature of such group watch sessions, users often chat with each other during presentation of the content. However, a large number of incoming chat messages can be distracting to a user and may reduce their enjoyment of the content. For example, each incoming chat message may be accompanied by a notification that a new message has been received. The notification by include a sound, haptic feedback, visual indication, or the like, and may interfere with a user's ability to consume the content. This can be even more distracting to, or unwanted by, the user during important segments of the content or segment of interest to the user. Furthermore, if the user is watching content on a mobile device on which multitasking is difficult, the user may not be able to engage in chat and watch the content simultaneously. What is needed is a system that enables and disables functions of a chat application during a group watch session to reduce interruptions to the user's consumption of content.

Systems and methods are described herein for selectively and automatically enabling and disabling features of a chat application during a group watch session. Each user in the group watch session is identified, as is a media asset being consumed by the users. The media asset comprises a plurality of segments, and an availability level of each user is determined for one or more segments of the media asset. For example, if a segment of the media asset is critical to the plot of the media asset or is otherwise of high importance to the media asset overall, the availability level of a user during that segment may be low. As another example, if a segment of the media asset is determined to be of interest to a user, the availability level of the user during that segment may also be low. If a segment is neither plot-critical nor of interest to the user, the user's availability level for that segment may be higher. If the availability level of the user for a given segment is below a threshold level, at least one function of a chat application is disabled on a device associated with the user for at least the duration of the segment. If the availability level of the user for a given segment meets or exceeds the threshold level, including when the availability level rises to or above the threshold level after having been below the threshold level, the at least one function of the chat application is enabled or reenabled.

To determine an availability level of a user for a given segment, metadata associated with the media content may be used to identify at least one characteristic of the segment. Using the at least one characteristic, an importance level of the segment can be determined. A profile of the user may be accessed and an engagement score of the user for the segment can be calculated. An availability level for the segment is then determined based on the importance level of the segment and the engagement score of the user for the segment.

In some embodiments, an engagement score may be calculated by monitoring the presence of the user during consumption of the media asset. For example, the user's distance from an output device, the user's gaze, biometric data, or other parameters may be used to determine whether the user is paying attention to the media asset. This presence data can then be used to determine an engagement score. For example, if the user is not currently paying attention, then the engagement score may be lower than if the user is currently paying attention. In some embodiments, the user's presence during all segments so far consumed by the user is used to determine the engagement score. A number of segments of the media asset for which the user has been present is determined, and the engagement score calculated based on the number of segments for which the user has been present. For example, if the user has consumed ten segments of the media asset but has not been present for five of those segments, the user's engagement score may be 50%.

Disabling at least one function of a chat application may encompass one or more actions depending on the function or functions being disabled. For example, the function may be display of a chat window, and disabling that function comprises transmitting an instruction to a device associated with the user to hide, minimize, or otherwise stop or suspend display of the chat window. Instructions received by the device may be executed by device hardware or by a software application running on the device. Enabling the function thus comprises transmitting an instruction to the device to resume display of the chat window. Another example of a function to be disabled is the immediate delivery of messages to the user, and disabling this function may comprise queueing messages for delivery to the user when the user's availability level meets or exceeds the threshold level. Enabling the function therefore comprises releasing any queued messages for delivery to the user and allowing immediate delivery of new messages. Visual, aural, and/or haptic notifications of incoming chat messages may also be disabled or enabled.

Yet another example of a function to be disabled is delivery of substantive messages. For example, some users may send short messages expressing reactions to the media (e.g., emojis), greeting the group upon joining the chat, or saying goodbye upon leaving the chat. Other users may send longer messages commenting on the media asset. The shorter messages may fall below a substantiveness threshold and may continue to be delivered, while the longer messages, which meet or exceed the substantiveness threshold, are not delivered. In some embodiments, the substantive messages may be queued for later delivery. When this function is enabled or reenabled, any undelivered messages may be delivered, and further substantive messages may be delivered immediately.

An additional function that may be disabled is delivery of messages containing spoilers. Messages may be processed using natural language processing. Based on the natural language processing, it is determined whether the message contains a spoiler. For example, the message may use phrases such as "wait until you see" followed by some details related to the media asset. In some embodiments, message content is also compared with metadata associated with the media asset to determine if the message contains spoilers. A segment of the media asset to which the spoiler relates is then identified (e.g., using metadata associated with the media asset) and delivery of the message is delayed until the user has consumed the identified segment. When this function is enabled or reenabled, any undelivered messages may be delivered.

The availability of users in the group watch session may be displayed to each user. In some embodiments, a visual indicator may be overlaid on a progress bar in a region of the progress bar corresponding to a segment during which the at least one function of the chat application will be disabled for a particular user. The visual indicator may include an identifier of the particular user and may have graphical properties corresponding to the particular function that will be disabled or to the particular user's availability level. The visual indicator may also be of a size corresponding to the amount of time that the at least one function will be disabled for the particular user. Alternatively or additionally, a representation of each user may be displayed, each representation having an icon overlaid on it corresponding to whether the at least one function of the chat application is disabled or enabled for that corresponding user.

In one embodiment, segments that are featured in and "Inside the episode" portion of the content are segments that are critical to the plot since. Such segments will thus drive the discussion between users once the content has been completed. Such segments may be identified using various image, audio, and video processing techniques either before or during streaming of the content. The identified segments may be given a special tag in a manifest file of the content that is being streamed. The tag can be used to trigger a player device to suspend chat activities when the player device requests such segments from the streaming server. There are other ways to predict which segments are important or critical to the plot. For example, segments with continuous speech (audio) across multiple frames or segments could indicate an important dialogue. Similarly, segments with fast moving objects could be an indication of an important scene (e.g., car chase, robbery or kidnapping in progress, etc.). Such a score or metadata can be obtained from the encoder directly as additional metadata and used by the player to control the functionality and/or layout of the chat window or interface. Similarly, public movie databases (e.g., IMDB) can be used to identify popular scenes.

In one embodiment, the activity/engagement score of the participants in the group watch session is used to determine when to present advertisements if the streaming service is ad supported. For example, it might be suitable to play an advertisement when the engagement score of most of the participants is high. Similarly, an advertisement can be presented upon detecting that one or more participants are reengaged with the content after not being engages for a threshold amount of time, For example, the absence of a user is detected at a first time, then a return of that user subsequently detected.

In one embodiment, activity scores for each participant are determined and updated during the group watch session. An activity score can be based on the participant's physical activities (e.g., movement) and physiological parameters (e.g., heart rate). Such data can be collected from wearables with sensors, such as a smart watch. For example, if the content being watched is scary (e.g., horror genre), then a high heart rate could cause a high activity score, in which case reading what others in the group are discussing, or even seeing video of the other participants might be helpful to the viewer in lowering their heart rate. It is important to note that the activity score, profile preferences, and the genre of the scene being watched can determine whether to enable or disable the chat features.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 11 is a flowchart representing a process for determining an engagement score of a user based on the presence of the user during segments of a media asset already consumed, in accordance with some embodiments of the disclosure;

FIG. 12 is a flowchart representing a process for allowing or preventing delivery of a message based on a substantiveness threshold, in accordance with some embodiments of the disclosure.

DETAILED DESCRIPTION

Figure 1:
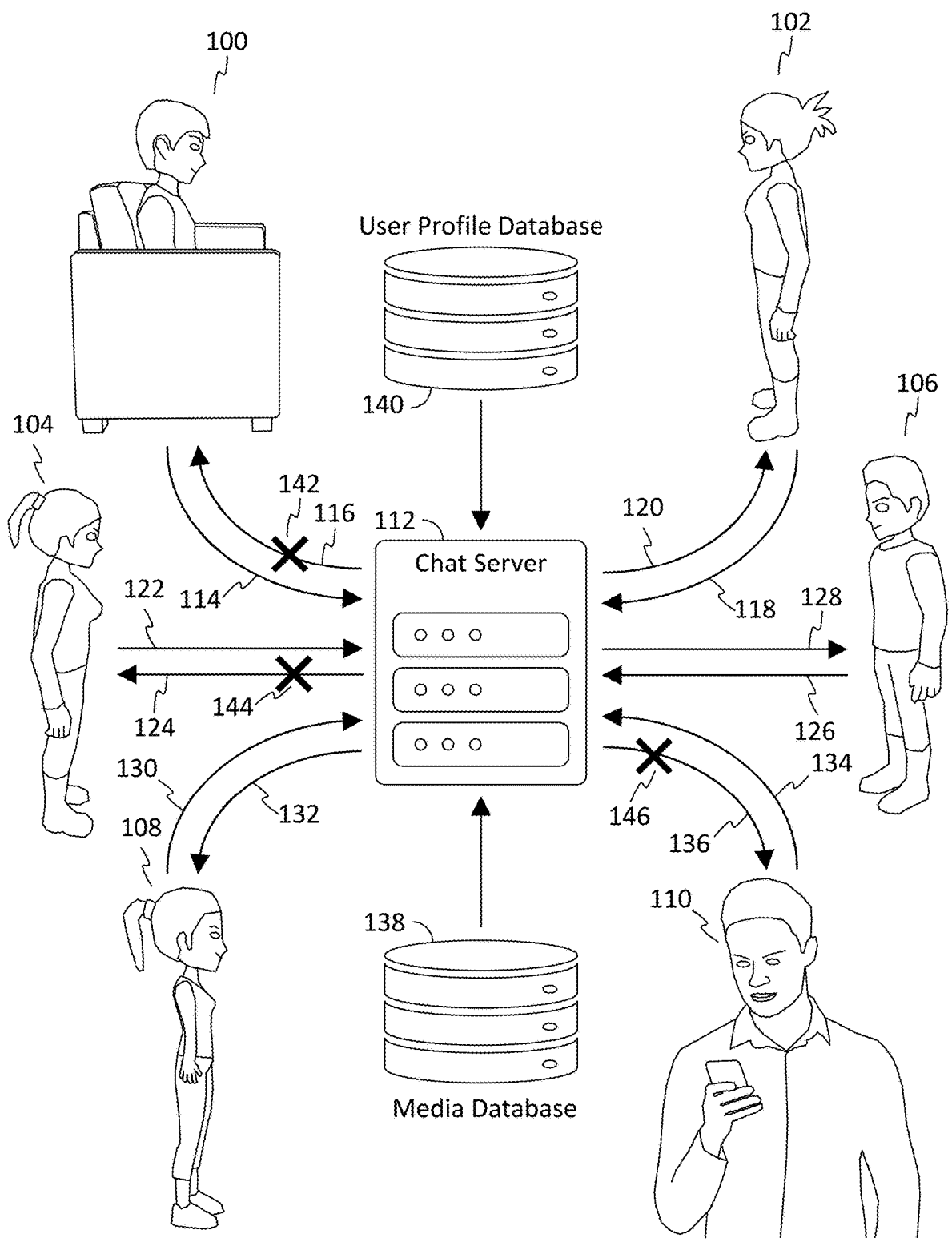
FIG. 1 shows an illustrative system in which at least one feature of a chat application is selectively and automatically disabled for some users, in accordance with some embodiments of the disclosure.

FIG. 1 shows an illustrative system in which at least one feature of a chat application is selectively and automatically disabled for some users, in accordance with some embodiments of the disclosure. A plurality of users 100, 102, 104, 106, 108, 110 may join a group watch session. During the group watch session, the users consume the same content, such as a movie or one or more episodes of a television show. For example, the users may consume an episode of the television show "The Flash." The group watch session may include a chat feature to allow the users to communicate with each other to discuss or react to the content. A server, such as chat server 112, administers the chat service and facilitates communication of chat messages between the users. In some embodiments, chat server 112 may be the same server that is providing the content for consumption.

Either upon a user joining the group watch session, or periodically during consumption of the content in the group watch session, a device of each respective user may report, to chat server 112, using communications paths 114, 118, 122, 126, 130, 134, the engagement of the respective user with the content overall, the engagement of the respective user with a segment of the content currently being consumed, an interest level of the respective user in the content overall, and/or an interest level of the respective user in a segment of the content currently being consumed. Chat messages from each user may also be received by chat server 112 using these communications paths. Chat messages are then transmitted to the users using communications paths 116, 120, 124, 128, 132, and 136.

Based on information reported to chat server 112 for each user and information (e.g., metadata) associated with the content being consumed (e.g., retrieved from media database 138), chat server 112 determines whether a given user should not be interrupted by incoming chat messages during each segment of the content. Chat server 112 may determine an availability level of each user for every segment of the content at the beginning of the group watch session using metadata of the content, interest level of the user in the content overall, or other user profile data received by, retrieved by (e.g., from user profile database 140), or reported to chat server 112. Chat server 112 may also determine an availability level of each user for a segment currently being consumed based on metadata describing the particular segment in addition to any or all of the information listed above. In some embodiments, chat server 112 may both determine preliminary availability levels of each user for every segment at the beginning of the group watch session and periodically update the preliminary availability levels based on user engagement with each segment consumed.

If chat server 112 determines that a user's availability level is below a threshold, indicating that the user is not to be disturbed, chat server 112 may disable one or more chat functions for that user. For example, user 100 may be highly interested in the content. Chat server 112 may determine this interest level by accessing the user's consumption history of related content. If the content being consumed in the group watch session is an episode of a television show, chat server 112 may determine from user profile data that user 100 has watched every preceding episode of the television show in a short period of time, indicating that user 100 is highly interested in the content. Alternatively or additionally, chat server 112 may determine, based on metadata of the content item, that the current segment of the content is critical to the plot of the content, or to a storyline that the user is interested in. Chat server 112 then disables 142 at least one chat function for user 100. This may include preventing delivery of messages to user 100, instructing a device associated with user 100 to minimize or hide a chat window, or filtering messages to allow only non-substantive messages to be delivered while preventing substantive messages from being delivered. Substantive messages may, in some embodiments, be queued for later delivery when user 100 may be disturbed (i.e., when the availability level of user 100 meets or exceeds the threshold level).

In another example, chat server 112 may determine that user 104 is behind other users in consuming the content. For example, user 104 may have temporarily paused playback of the content in order to perform another task or may have experienced network connectivity and/or bandwidth issues that caused user 104 to fall behind relative to the other users. Chat server 112 may scan the content of each message before delivery to other users to determine whether a message contains spoilers for a segment of content not yet consumed by a user. If a message containing a spoiler for a segment that user 104 has not yet consumed is sent by another user, chat server 112 may disable 144 a chat function for user 104, e.g., prevent delivery of that message to user 104. Chat server 112 may queue the message for delivery to user 104 when user 104 has completed consumption of the segment to which the spoiler relates. In some embodiments, chat server 112 may use message threading to determine a relationship between each message. If other users respond to the message containing the spoiler, chat server 112 may prevent delivery of those messages as well. Once user 104 has completed consumption of the segment to which the spoiler relates, chat server 112 may reenable the chat function for user 104 and deliver the entire thread of messages stemming from the message containing the spoiler to user 104.

If a user is using a mobile device, such as a smartphone, that has a limited screen size, it may not be possible for the user to simultaneously consume the content and engage in chat. The user may need to switch from a media application to a separate chat application, or to a separate window or tab within the media application, to view and respond to chat messages. Alternatively or additionally, the user may have a limited or poor network connection using the mobile device. Receiving and responding to chat messages may consume bandwidth needed for the user to be able to consume the content. If chat server 112 determines that user 110 is using a mobile device, or that the user has a poor network connection or limited bandwidth, chat server 112 may disable 146 a chat function for user 110, e.g., prevent delivery of all chat messages to user 110. When chat server 112 determines that user 110 has a better network connection and that a current segment of the content is not critical to the plot of the content, chat server 112 may reenable the chat functions for user 110.

Figure 2:
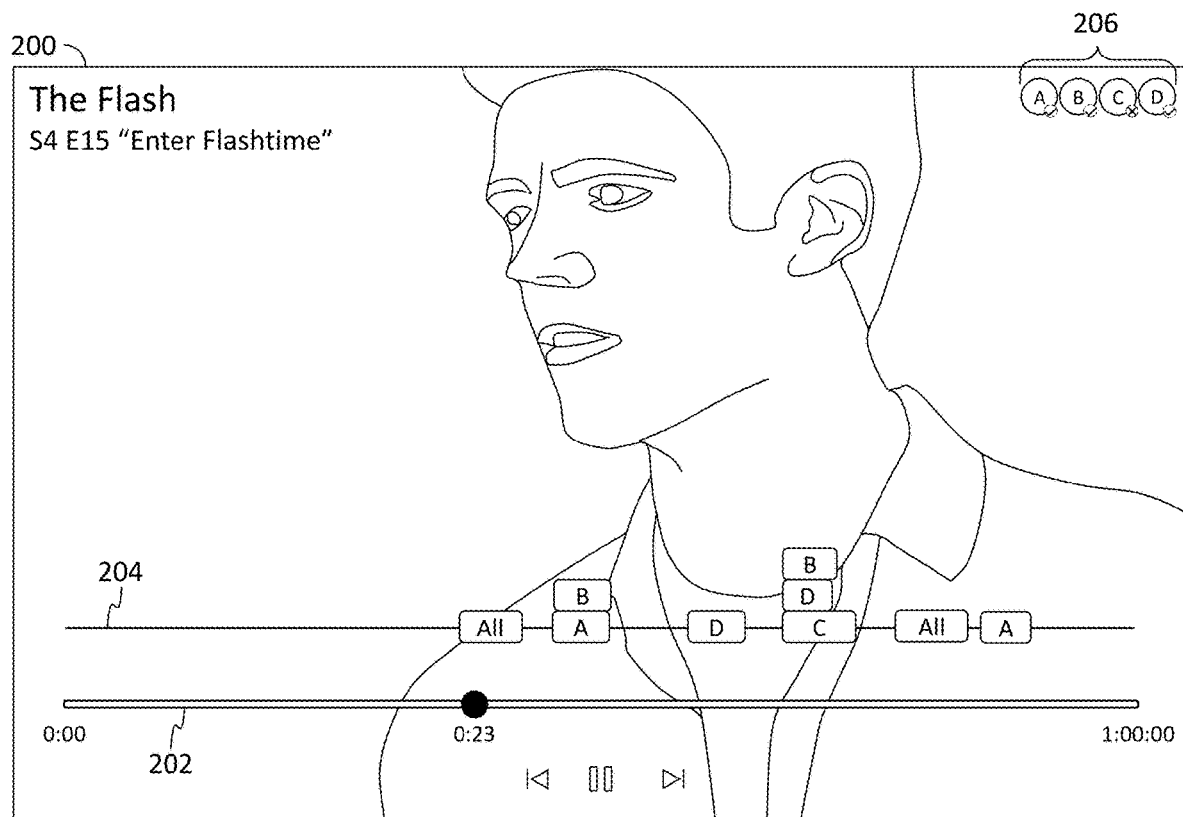
FIG. 2 shows an illustrative display of a media asset and visual indicators representing the availability of each user, in accordance with some embodiments of the disclosure.

After determining that a user's availability level will be below a threshold level for a given segment of the content, a visual indication that a function of a chat application will be disabled for the user may be generated for display to the other users in the group watch session. FIG. 2 shows an illustrative display 200 of a media asset and visual indicators representing the availability of each user, in accordance with some embodiments of the disclosure. Display 200 includes progress bar 202 indicating a current playback position of the user within the content item. Display 200 also includes a secondary bar 204 along which are positioned visual indicators showing which users will be unavailable for chat (i.e., have at least one function of a chat application disabled). Secondary bar 204 has a length similar to that of progress bar 202, and the visual indicators are placed along secondary bar 204 at positions corresponding to playback positions along progress bar 202 of segments during which the associated user will be unavailable. The visual indicators are described in more detail below in connection with FIG. 4.

In some embodiments, secondary bar 204 may be overlaid on progress bar 202 or may be combined with progress bar 202. Also shown in display 200 are visual representations 206 corresponding to each user in the group watch session other than the user to whom they are displayed. Each visual representation of a user is partially overlaid by an icon corresponding to the respective user's current availability level. Visual representations 206 are described in more detail below in connection with FIG. 3. In some embodiments, secondary bar 204 is only displayed in response to a user input such as a pause, rewind, fast-forward, or skip command. In some embodiments, visual representations 206 are always displayed except when secondary bar 204 is visible.

Figure 3:
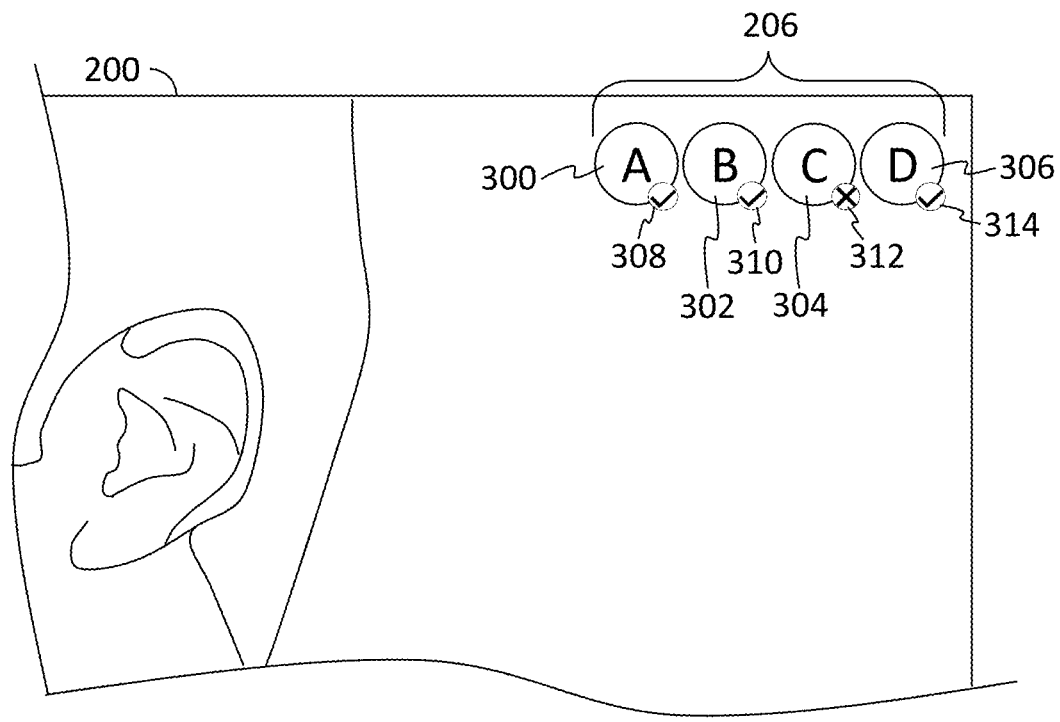
FIG. 3 shows an illustrative example of representations of each user with overlaid icons representing the availability of each respective user, in accordance with some embodiments of the disclosure.

FIG. 3 shows an illustrative example of representations of each user with overlaid icons representing the availability of each respective user, in accordance with some embodiments of the disclosure. Visual representations 206 may be displayed on display 200. Visual representations 206 may comprise representations 300, 302, 304, and 306, each representing one of users A, B, C, and D, respectively. Each representation is overlaid with an availability icon. Representations 300, 302, and 306 are overlaid with icons 308, 310, and 314, each containing a check mark indicating that users A, B, and D are currently available for chat. Representation 304 is overlaid with icon 312 containing an "x" mark indicating that user C is currently unavailable for chat.

Figure 4:
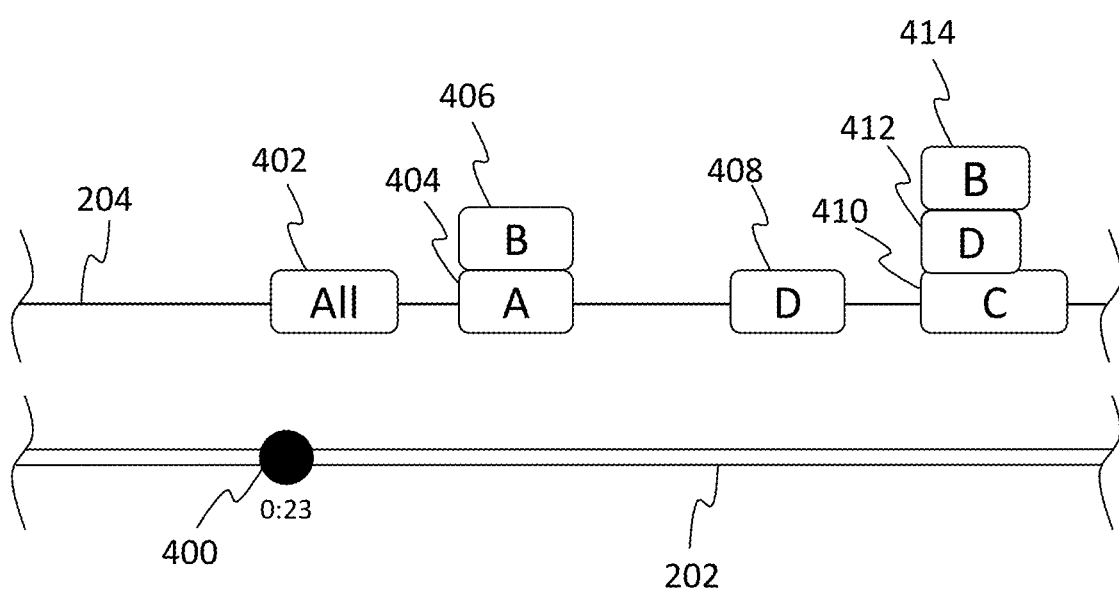
FIG. 4 shows an illustrative example of a progress bar and visual indicators representing the availability of each user, in accordance with some embodiments of the disclosure.

FIG. 4 shows an illustrative example of a portion of progress bar and visual indicators representing the availability of each user, in accordance with some embodiments of the disclosure. Progress bar 202 includes a current playback position indicator 400. Secondary bar 204 includes visual indicators in regions of secondary bar 204 aligning with regions of progress bar 202 that correspond to segments of the content during which at least one user will be unavailable for chat. For example, indicator 402 shows that all users are currently unavailable for chat, and the region in which indicator 402 is placed aligns with current playback position indicator 400. Users A and B are shown, by indicators 404 and 406 respectively, to be unavailable during a later segment. Similarly, indicator 408 shows user D will be unavailable during another segment, and indicators 410, 412, and 414 show users C, D, and B, respectively, to be unavailable during yet another segment. The size of each indicator corresponds to the amount of time the corresponding user will be unavailable. In some embodiments, the visual indicators may be differently colored, patterned, or otherwise visually distinguished from one another to represent each user's actual availability level during the segment.

Figure 5:
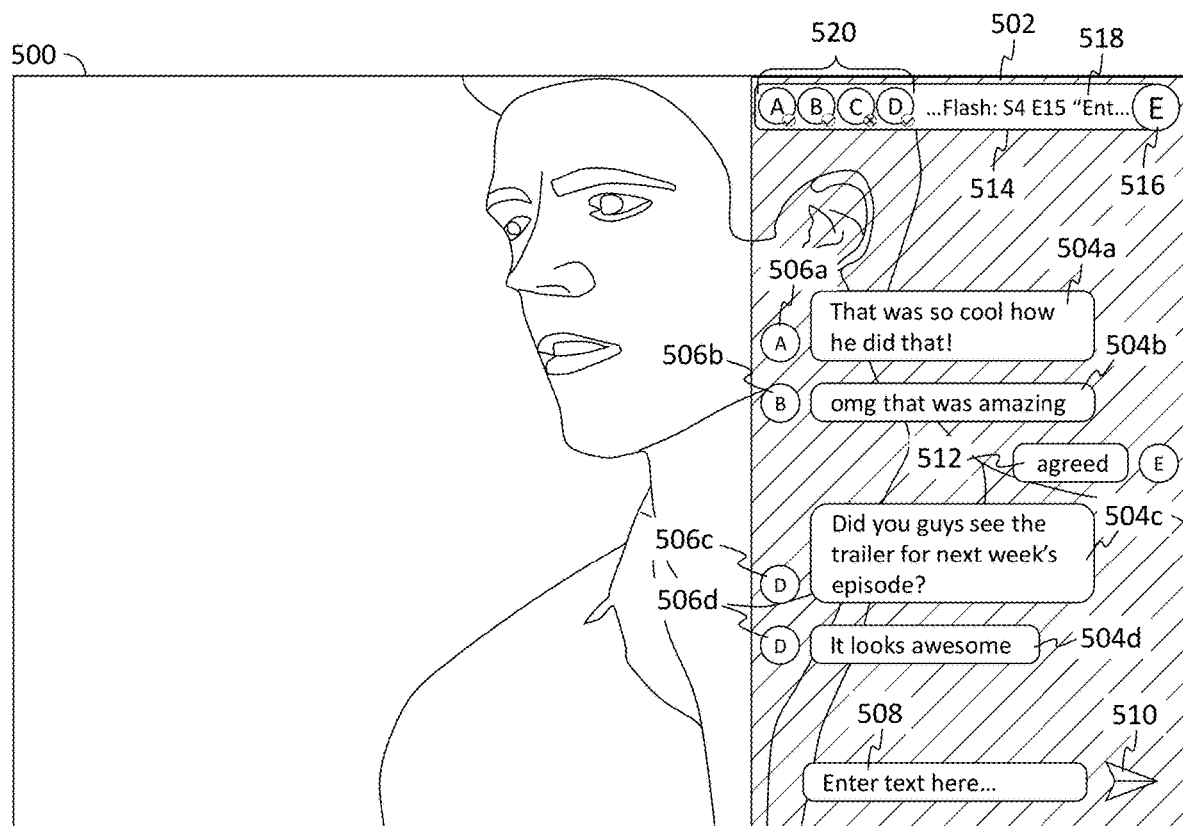
FIG. 5 shows an illustrative display of a chat window, in accordance with some embodiments of the disclosure.

FIG. 5 shows an illustrative display of a chat window, in accordance with some embodiments of the disclosure. On larger displays, it may be possible to show the content and a chat window simultaneously. Display 500 shows the content and, simultaneously, chat window 502. In the embodiment of FIG. 5, chat window 502 is displayed as a semi-transparent overlay over a portion of the content. In other embodiments, the chat window may be displayed side-by-side with the content without overlapping or may be displayed on a second device. Displayed within chat window 502 are messages 504a-d received from other users. Alongside each message an indication of the user who sent the message is displayed. For example, next to message 504a is indication 506a showing that user A sent message 504a. A text input field 508 is also contained within chat window 502. A user may enter a message into text input field 508 using a keyboard, a touchscreen interface, a speech-to-text engine, or any other suitable text input method. Once entered, the message is sent by selecting button 510. Messages sent by the user are also displayed in chat window 502, such as message 512.

Chat window 502 may also include graphical interface elements relating to the user, the content being consumed, and the availability of other users. For example, graphical element 514 includes an identifier 516 of the user and a text portion 518 identifying the title of the content being consumed. In the example of FIGS. 2-6, the group watch session is watching an episode of the television show "The Flash" whose title is too long to display fully in text portion 518. Text portion 518 may therefore automatically scroll through the title of the content. Graphical element 514 may also include representations 520, similar to representations 206 described above in connection with FIGS. 2 and 3.

In some embodiments, chat functions may be disabled for a user if a message is determined to contain a spoiler. For example, a message sent by one user may contain a spoiler for a segment of the content not yet consumed by another user. The message may be determined to contain a spoiler by the chat server by comparing content of the message with media data. Alternatively or additionally, a user's ability to send messages may be blocked if a message entered by the user is determined to contain a spoiler. This type of spoiler detection may be performed by using natural language processing to determine whether the message is referring to a specific plot point, storyline element, or other detail of the content, prior to the sending of the message. The chat server may receive the message for natural language processing as the user enters it or may receive the message prior to the user choosing to send the message. If the chat server determines that the message contains a spoiler, the chat server may prevent the user from sending the message by blocking incoming messages from the user, or by instructing the device of the user to disable the sending function of the local chat application.

Alternatively, the natural language processing may be performed locally on the device on which the user has entered the message. If a spoiler is detected, the user's ability to send the message may be blocked by the local chat application. In some embodiments, an indication that the message contains a spoiler is sent to the chat server, which in turn blocks the user from being able to send the message or instructs the device of the user to disable the sending function of the local chat application.

Figure 6:
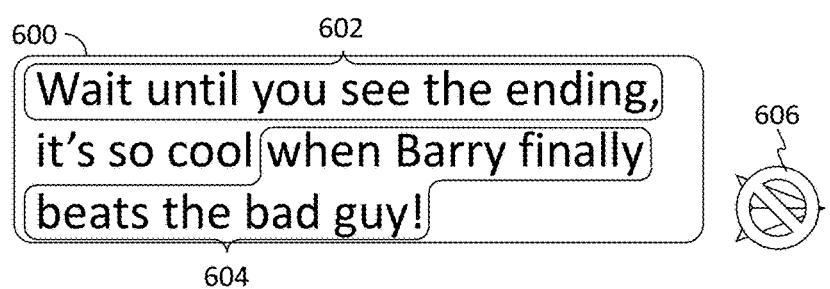
FIG. 6 shows an illustrative example of a chat message determined to contain a spoiler, in accordance with some embodiments of the disclosure.

FIG. 6 shows an illustrative example of a chat message determined to contain a spoiler, in accordance with some embodiments of the disclosure. Message 600 is entered by a user. Using natural language processing, portions 602 and 604 of message 600 are identified. Portion 602 "Wait until you see the ending" is determined to refer a segment of the content that the user expects other users not to have seen yet. Specifically, the phrase "wait until" is identified as a phrase used to build anticipation for a future event, and "the ending" is identified as referring to the climax or resolution of the content being consumed. Portion 604 "when Barry finally beats the bad guy" is determined to refer to a specific event in the content. In response to either or both of these portions being detected, the user may be prevented from sending message 600. For example, a disabling icon 606 may be placed over a send button (e.g., button 510). In some embodiments, the chat server detects these portions in message 600 sent by the user and prevents delivery of message 600 to other users who have not yet consumed the segment of content to which the spoiler contained in message 600 relates. The chat server may access metadata relating to the content to determine which segment of the content is affected by the spoiler and track each user's progression through the content. The chat server then determines which users have not consumed the relevant segment of the content and prevents delivery of message 600 to only those users, while allowing delivery of message 600 to users who have already consumed the relevant segment. The chat server may continue to monitor the progress of each user through the content and may release message 600 for delivery to users as they complete consumption of the relevant segment of the content.

Figure 7:
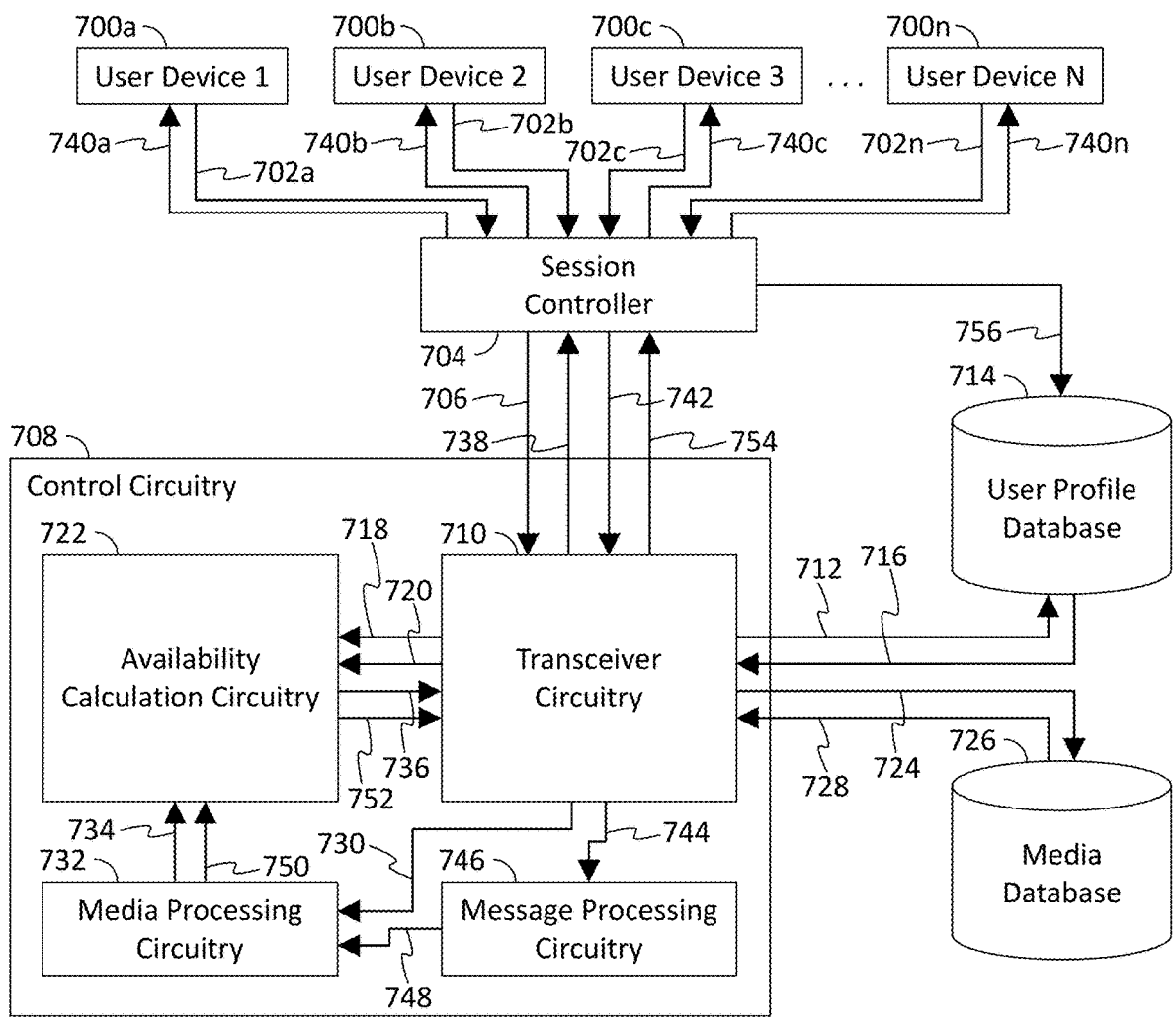
FIG. 7 is a block diagram showing components and data flow therebetween of a system for selectively and automatically enabling and disabling at least one function of a chat application, in accordance with some embodiments of the disclosure.

FIG. 7 is a block diagram showing components and data flow therebetween of a system for selectively and automatically enabling and disabling at least one function of a chat application, in accordance with some embodiments of the disclosure. A plurality of user devices 700*a*-*n* join a group watch session. The group watch session includes a chat component allowing users in the group watch session to communicate with each other during consumption of a media asset. Each user device transmits 702*a*-*n* a handshake or other request to join the group watch session to session controller 704. Session controller 704 receives an identifier of each user as part of the request to join the session. Session controller 704 coordinates the group watch session and related chat messages. Session controller 704 also receives a media asset identifier for the content being consumed in the group watch session. Session controller 704 transmits 706 the media asset identifier and the identifiers of each user in the group watch session to control circuitry 708, where they are received using transceiver circuitry 710.

Control circuitry 708 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICS), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Transceiver circuitry 710 comprises a network connection over which data can be transmitted to and received from remote devices, such as an ethernet connection, WiFi connection, USB connection, or connection employing any other suitable data transfer protocol or networking protocol.

Transceiver circuitry 710, using the identifiers of the users in the group watch session received from session controller 704, transmits 712 a request for user profile data associated with each identified user to user profile database 714. User profile database 714 may reside in memory on the same device in which control circuitry 708 resides or may be stored at a server remotely located from the device in which control circuitry 708 resides. Transceiver circuitry 710 receives 716, in response to the request, user profile data for each identified user in the group watch session from user profile database 714. The user profile data may include, for each respective identified user, device-level information describing the device currently in use by the user to participate in the group watch session, network-level information describing current network conditions (e.g., bandwidth, latency, etc.) for the user, content preferences for the user, user interests, content engagement histories for the user, and any other suitable user data.

Transceiver circuitry 710 transmits 718 the identifiers of the users in the group watch session and also transmits 720 the user profile data of each user to availability calculation circuitry 722. Availability calculation circuitry 722 determines, based on the user profile data, an availability level for each identified user. The availability level for each user may be based on the device-level information, such as whether a display of the device on which a user is watching the media asset is large enough to accommodate a chat window without entirely obscuring view of the media asset, or whether visual notifications of incoming chat messages will obscure a significant portion of the display. Availability calculation circuitry 722 may determine, based on this information, a percent probability that each user can be interrupted by, or is available to receive, a chat message. For example, if the device-level information indicates that a user is consuming the media asset on a smart TV, the user may be available to receive chat messages on the same screen as the media asset, resulting in a high percent probability (e.g., 90%) that the user is available. Availability calculation circuitry 722 may also determine that user has a secondary device (e.g., a smartphone) that is not being used to consume the media asset and on which the user can receive chat messages without obscuring any portion of the display of the media asset.

The availability level may, alternatively or additionally, be based on network-level information for each identified user. If a user has limited bandwidth available, it may cause increased buffering for the user if additional network transmissions including chat messages were received. Availability calculation circuitry 722 may determine that a user is currently experiencing network issues such as reduced bandwidth or increased latency. For example, availability calculation circuitry 722 may compare the available bandwidth of a user with an average amount of bandwidth needed for streaming media. Availability calculation circuitry 722 may determine, based on the comparison, whether the amount of bandwidth available to the user is below the average and, if so, calculate an availability level corresponding to the magnitude of deviation from the average bandwidth. For example, an average of 20 megabits of bandwidth may be used for streaming HD video. A user having exactly this average amount of bandwidth available may be given an availability level of 50%. If a user has only 10 megabits of available bandwidth, which is half of the average, then availability calculation circuitry 722 may determine an availability level for that user of 25% (i.e., half of the availability level corresponding to the average amount of bandwidth).

Availability calculation circuitry 722 may, alternatively or additionally, consider the media asset being consumed, both as a whole and on a segment-by-segment basis, in determining availability levels for each user. Upon receiving the identifier of the media asset, transceiver circuitry 710 transmits 724 a request to media database 726 for metadata describing the identified media asset. Transceiver circuitry 710 receives 728, in response to the request, the metadata and in turn sends 730 the metadata to media processing circuitry 732. Media processing circuitry 732 extracts from the metadata information describing each segment of the media asset (e.g., importance, storyline, characters/actors present in the segment, etc.), as well as global information describing the media asset as a whole (e.g., genre, actors, title, etc.). In some embodiments, media processing circuitry 732 obtains access to audio and/or video data of the media asset in addition to the metadata. Media processing circuitry 732 then analyzes video of the media asset to determine if there are fast-moving objects or other indications of action in a particular segment. Media processing circuitry 732 may perform image recognition to determine actors or characters present in the segment. Media processing circuitry 732 may analyze audio of the media asset to determine if there is dialogue in the segment. Media processing circuitry 732 may use any or all of this information to determine an importance level for each segment of the media asset.

Media processing circuitry 732 sends 734 the importance level of each segment to availability calculation circuitry 722. Media processing circuitry 732 may also send certain metadata, such as whether a segment is critical to the plot or characters or actors present in the segment, to availability calculation circuitry 722. Availability calculation circuitry 722 then calculates an availability level of each user for each segment of the media asset. For example, if a segment is critical to the plot of the media asset, availability calculation circuitry 722 calculates a low availability level (e.g., 10%), while if the segment is a simple transitional segment with no relevance to the plot, availability calculation circuitry 722 calculates a high availability level (e.g., 90%). Availability calculation circuitry 722 may calculate availability levels by comparing the metadata to user profile data, such as user interest. For example, the metadata indicates that the media asset, or a segment of the media asset, is a comedy. If the user profile data indicates that the user does not like comedies, availability calculation circuitry 722 calculates a higher availability level than if the user profile data indicates that the user does like comedies.

Availability calculation circuitry 722 may also, in some embodiments, calculate an engagement score for each identified user. The engagement score may be based on user engagement with the content as a whole, or on a segment-by-segment basis. For example, if a user is not paying attention to the media asset, availability calculation circuitry 722 may calculate a low engagement score for that user. Availability calculation circuitry 722 may analyze past user engagement with content similar to the media asset being consumed in the group watch session. If the user has historically not been engaged with similar content, availability calculation circuitry 722 may calculate a low engagement score for the current media asset. In some embodiments, control circuitry 708 may monitor the presence of the user using one or more of a camera, infrared sensor, biometric sensor (e.g., heart rate monitor, electroencephalogram, etc.), including wearable devices such as smart watches. As used herein, the presence of a user means not only the physical presence of the user in the vicinity of the device on which the user is consuming content but also the mental presence of the user, such as whether the user is paying attention, and the physiological presence of the user, such as whether the user is awake, asleep, energetic, lethargic, etc.

The cameras and/or sensors may be disposed at each user device 700a-n, and data captured by the sensors may be transmitted to control circuitry 708 via session controller 704, or may be separately stored in user profile database 714. Availability calculation circuitry 722 may determine, for example, using image data captured by a camera or other imaging sensor, that a user is not looking at the display on which he or she is consuming the media asset. As another example, availability calculation circuitry 722 may determine, based on a user's heart rate and/or brain activity, that the user is sleeping. Availability calculation circuitry 722 may therefore assign a low engagement score to the user. If availability calculation circuitry 722 determines that the user is paying attention to the media asset, availability calculation circuitry 722 may assign a high engagement score to the user.

In some embodiments, the engagement score for a user is first determined based on global information about the media asset and user profile information of the user. The user's presence is then tracked during consumption of the media asset. If the user is not present for at least a threshold number of segments of the media asset, availability calculation circuitry 722 may adjust the user's engagement score down by a corresponding amount. Conversely, if the user is present and paying full attention to every segment of the media asset, availability calculation circuitry 722 may adjust the user's engagement score up.

After determining the engagement score, availability calculation circuitry 722 may combine the engagement score with an interest level of the user in the media asset to arrive at an availability level for the user. For example, if the user's engagement score is 50% and the user's interest level is 75%, availability calculation circuitry 722 may calculate the average of 62.5% and subtract from 100% to arrive at 37.5% as the user's availability level. Availability calculation circuitry 722 may give more weight to an engagement score if the engagement score is over 50%. For example, if the engagement score is 90% and the interest level is 50%, this may indicate that the user is becoming more interested in the type of media asset being consumed above what was determined based on the user profile information. A simple average may therefore yield an inaccurate representation of the user's actual availability for receiving chat messages. Therefore, availability calculation circuitry 722 may apply a weighting factor of 1.5 to the engagement score before taking the average. Availability calculation circuitry 722 therefore calculates an availability level of only 7.5%.

Once an availability level has been calculated for each user, availability calculation circuitry 722 transmits 736 the availability levels of each user to transceiver circuitry 710, which in turn transmits 738 the availability levels of each user to session controller 704. Session controller 704 compares the availability level of each user to a threshold availability level. If a user's availability level is below the threshold availability level, then session controller 704 disables at least one function of a chat application on the user device associated with that user. For example, if the availability level of the user associated with user device 1 700a is below the threshold availability level, session controller 704 transmits 740a an instruction to user device 1 700a to disable the at least one function of the chat application (e.g., disabling a notification sound, disabling a visual notification, disabling a haptic notification, hiding or minimizing a chat window, etc.). Session controller 704 may also disable chat functions by preventing or delaying delivery of chat messages to users who are not available.

In some embodiments, disabling a chat function for a user may be triggered by detection of a spoiler in a chat message. Before transmitting a message from one user to other users, session controller 704 transmits 742 the message to control circuitry 708. Transceiver circuitry 710 receives the message and in turn transmits 744 the message to message processing circuitry 746. Message processing circuitry 746 performs natural language processing of the message to determine the semantic content of the message. For example, message 504a "That was so cool how he did that!" is processed to determine that the message generally refers to an event that happened in the past but does not provide specific details as to the event. Such a message would not be considered to contain a spoiler. However, message 600 "Wait until you see the ending, it's so cool when Barry finally beats the bad guy!" is processed to determine that the message refers to something that has already occurred for the sender because the phrase "Wait until you see" implies that the sender has already seen the event but expects that others have not yet seen it. Further, the phrase "when Barry finally beats the bad guy" refers to an event with sufficient specificity to qualify as a spoiler.

If a message is determined to contain a spoiler, message processing circuitry 746 transmits 748 the content of the message to media processing circuitry 732. Media processing circuitry 732 compares the content of the message with metadata describing segments of the media asset being consumed to identify the segment to which the spoiler relates. For example, metadata of a segment may identify which characters are present in the segment and summarize the actions taken by each character during the segment. Media processing circuitry 732 identifies the relevant segment and transmits 750 an identifier of the relevant segment to availability calculation circuitry 722. Availability calculation circuitry 722 determines, based on information received from session controller 704 or from user profile database 714, an identifier of the segment each user in the group watch session is currently consuming. If a user is determined to be consuming a segment that comes before the relevant segment in the media asset, availability calculation circuitry 722 transmits 752 an identifier of the user and a signal to prevent delivery of the message to transceiver circuitry 710, which in turn transmits 754 the identifier and signal to session controller 704. In response, session controller 704 prevents delivery of the message. Session controller 704 may store the message for later delivery to the user after the user has completed consumption of the relevant segment.

In some embodiments, session controller 704 also receives, from each user device, device-level and network-level information describing the device (e.g., model of device, available bandwidth, network type, etc.). Session controller 704 may transmit this information directly to control circuitry 708. In some implementations, this transmission may replace the request for, and receipt of, some or all user profile information from user profile database 714. In other embodiments, session controller 704 transmits 756 the information to user profile database 714, from which it is later requested by control circuitry 708 as described above.

Figure 8:
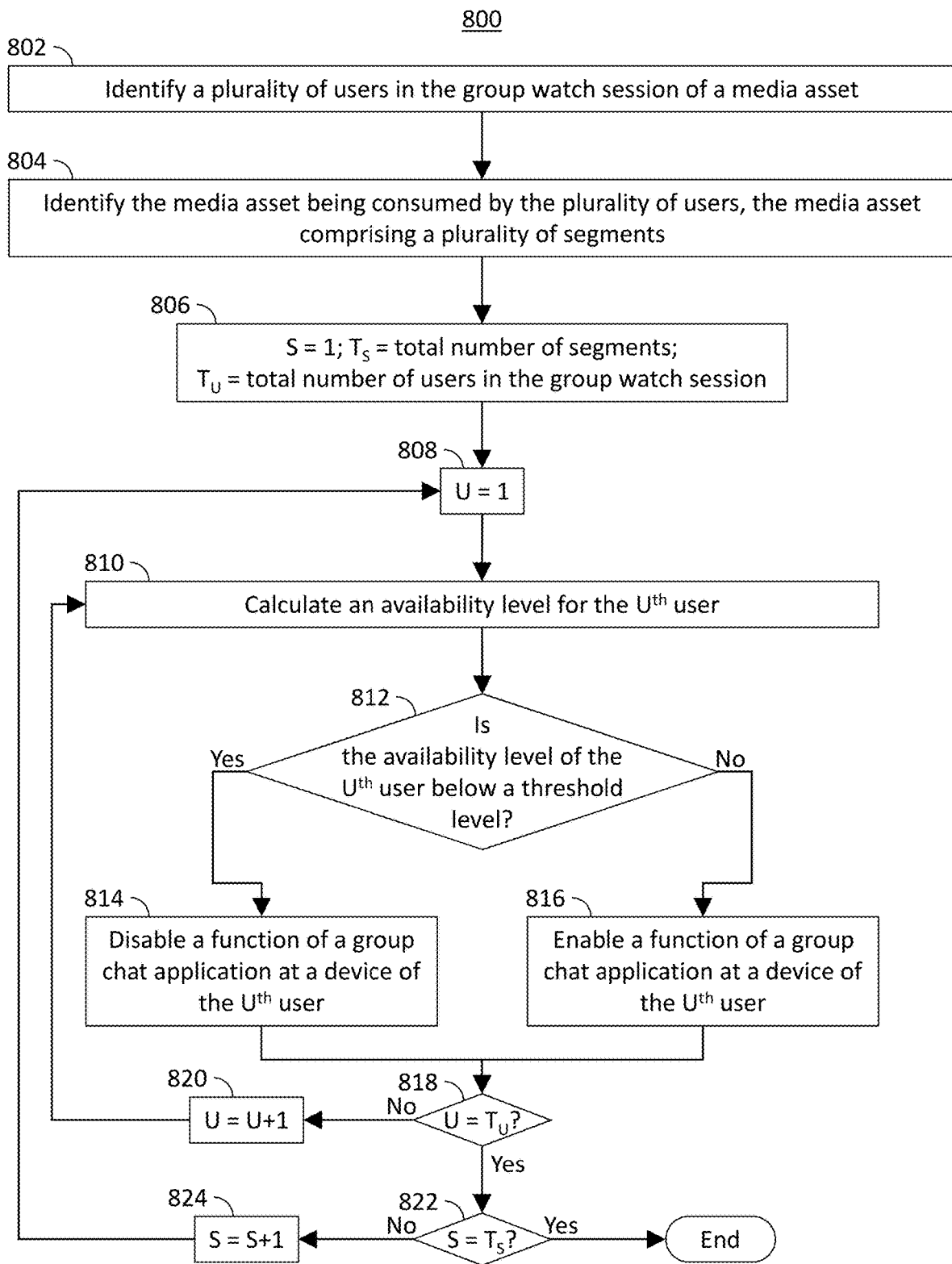
FIG. 8 is a flowchart representing a process for selectively and automatically disabling or enabling a function of a chat application, in accordance with some embodiments of the disclosure.

FIG. 8 is a flowchart representing an illustrative process 800 for selectively and automatically disabling or enabling a function of a chat application, in accordance with some embodiments of the disclosure. Process 800 may be implemented on control circuitry 708. In addition, one or more actions of process 800 may be incorporated into or combined with one or more actions of any other process or embodiment described herein.

At 802, control circuitry 708 identifies a plurality of users in a group watch session of a media asset. For example, as each user requests to join the group watch session, an identifier of that user is received by session controller 704 and provided to control circuitry 708. At 804, control circuitry 708 identifies the media asset being consumed by the plurality of users. For example, session controller 704 administers the group watch session and coordinates at least a start of consumption of a media asset for every user. Session controller 704 thus obtains an identifier of the media asset in order to coordinate the group watch session and provides the identifier to control circuitry 708. The media asset comprises a plurality of segments.

At 806, control circuitry 708 initializes a counter variable S, setting its value to one, a variable $T_S$ representing the total number of segments in the media asset, and a variable $T_U$ representing the total number of users in the group watch session. At 808, control circuitry initializes a second counter variable U, also setting its value to one.

At 810, control circuitry 708 calculates an availability level of the $U^{th}$ user. This may be accomplished using methods described above in connection with FIG. 7 or methods described below in connection with FIG. 9. For example, control circuitry 708 may compare one or more characteristics of the media asset with user profile data of the $U^{th}$ user to determine whether the user is interested in the content. If the user is not interested in the content, the user may be more available to receive chat messages because he or she will not mind missing some portions of the content. If the user is interested in the content, the user may be less available to receive chat messages because they may not want to be interrupted in their consumption of the content. As another example, control circuitry 708 may determine if a current or upcoming segment of the content media asset is of high importance to the media asset (e.g., critical to the plot, high amounts of dialogue, etc.). If the segment is of high importance, users will be less likely to want to be interrupted. Therefore, users will be less available during important segments.

At 812, control circuitry 708 determines whether the availability level of the $U^{th}$ user is below a threshold level. For example, the $U^{th}$ user may be mildly interested in the media asset, and the current segment may be important. Control circuitry 708 may calculate, based on these factors, an availability level of 30% for the user. Control circuitry 708 compares this value to a threshold, such as 35%, below which the user is not to be interrupted by chat messages. If it is determined that the availability level of the $U^{th}$ user is below the threshold level ("Yes" at 812), then, at 814, control circuitry 708 disables a function of a group chat application at a device of the $U^{th}$ user. For example, control circuitry 708 transmits a signal, either directly to the user device or via session controller 704, to hide or minimize a chat window, to disable aural, visual, and/or haptic notifications of incoming messages, or to delay delivery of messages until the $U^{th}$ user's availability level again meets or exceeds the threshold level. Conversely, if it is determined that the availability level of the $U^{th}$ user meets or exceeds the threshold level ("No" at 812), then, at 816, control circuitry 708 enables a function of the group chat application at the device of the $U^{th}$ user. Any function previously disabled due to the $U^{th}$ user's availability level falling below the threshold level is therefore reenabled.

At 818, control circuitry 708 determines whether U is equal to $T_U$, meaning that an availability level has been calculated for all users for the $S^{th}$ segment. If U is not equal to $T_U$ ("No" at 818), then, at 820, control circuitry 708 increments the value of U by one, and processing returns to 810. If U is equal to $T_U$ ("Yes" at 818), then, at 822, control circuitry 708 determines whether S is equal to $T_S$, meaning that an availability level has been calculated for all users for all segments of the media asset. If S is not equal to $T_S$ ("No" at 822), then, at 824, control circuitry 708 increments the value of S by one, and processing returns to 808. If S is equal to $T_S$ ("Yes" at 822), then the process ends.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
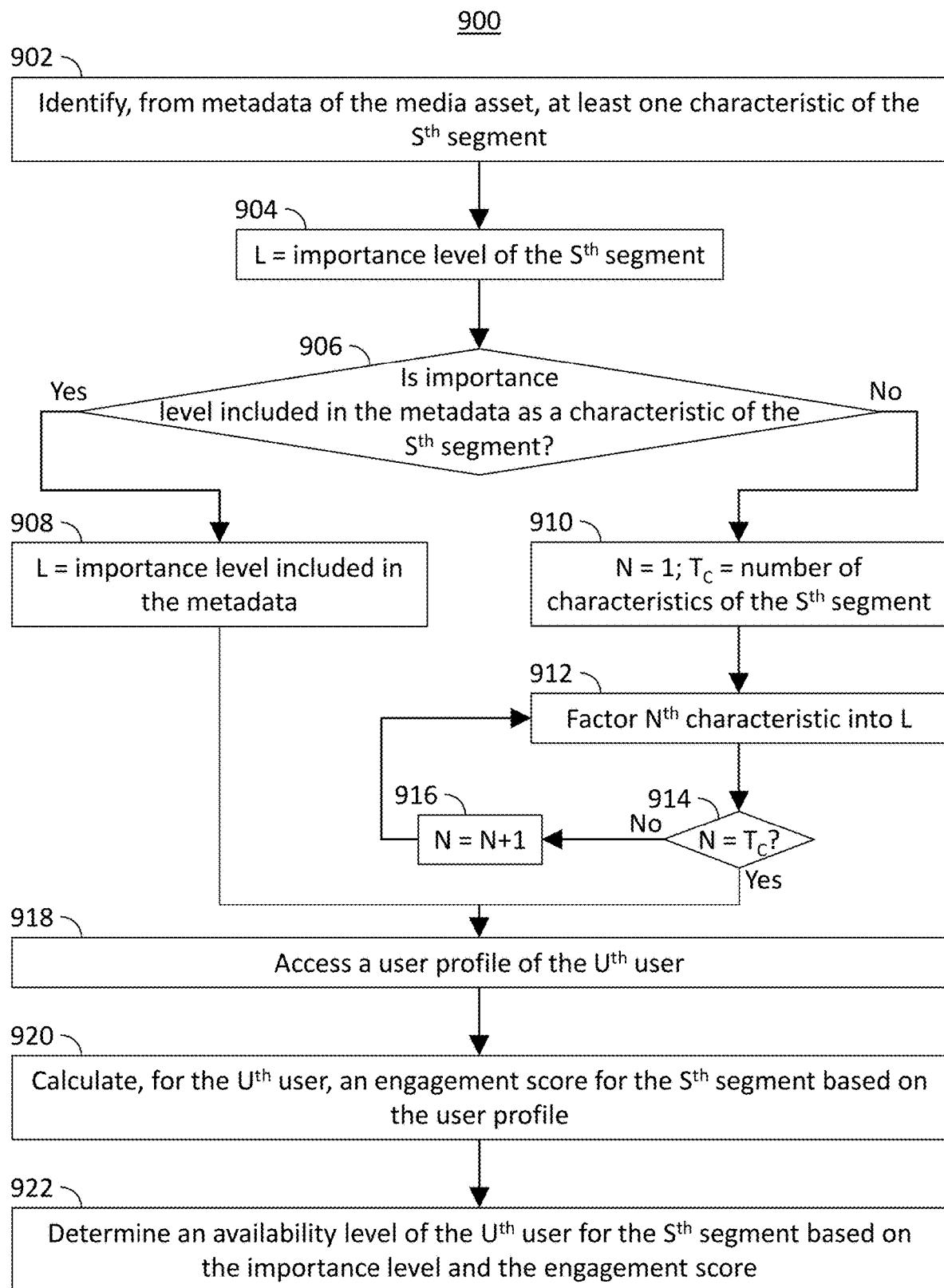
FIG. 9 is a flowchart representing a process for determining the availability level of a user, in accordance with some embodiments of the disclosure.

FIG. 9 is a flowchart representing an illustrative process 900 for determining the availability level of a user, in accordance with some embodiments of the disclosure. Process 900 may be implemented on control circuitry 708. In addition, one or more actions of process 900 may be incorporated into or combined with one or more actions of any other process or embodiment described herein.

At 902, control circuitry 708 identifies, from metadata of the media asset, at least one characteristic of the $S^{th}$ segment. The metadata may include characteristics such as plot points, characters or actors present in the segment, dialogue captions, dialogue summaries, action signatures, motion signatures, audio signatures of speech, audio signatures of background music, or any other suitable data describing a segment of the media asset. The metadata may also include a predetermined importance level.

At 904, control circuitry 708 initializes a variable L representing the importance level of the $S^{th}$ segment. At 906, control circuitry 708 determines whether importance level is included in the metadata as a characteristic of the $S^{th}$ segment. If importance level is included in the metadata ("Yes" at 906), then, at 908, control circuitry 708 sets L equal to the importance level included in the metadata. In some cases, importance levels included in metadata may be simple levels, such as "low," "medium," and "high" whereas the importance level to be determined by control circuitry 708 is a numerical value (e.g., an integer between 0 and 10). Control circuitry 708 may convert simple levels to corresponding numerical values. For example, a "low" importance level may be converted to an importance level of 3, "medium" may be converted to an importance level of 6, and "high" may be converted to an importance level of 9.

If importance level is not included as a characteristic of the $S^{th}$ segment in the metadata ("No" at 906), then, at 910, control circuitry 708 initializes a counter variable N, settings its value to one, and a variable Tc representing the number of characteristics of the $S^{th}$ segment included in the metadata. At 912, control circuitry 708 factors the $N^{th}$ characteristic into the calculated importance level L. For example, control circuitry 708 may initially set the value of L to an average value, such as 5 (where the importance level of a segment is calculated as an integer value between 0 and 10). Control circuitry 708 may then adjust the value of L up or down depending on the characteristics of the $S^{th}$ segment. For example, the $N^{th}$ characteristic may be characters present in the $S^{th}$ segment. If the characters are main characters, the importance level may be increased. The $N^{th}$ characteristic may be dialogue captions of the $S^{th}$ segment and may contain very little dialogue. Control circuitry 708 may therefore adjust the importance level down.

In some embodiments, control circuitry 708 may use user profile data in conjunction with the characteristics to determine an amount by which to adjust the value of L. For example, the $N^{th}$ characteristic may be characters present in the $S^{th}$ segment. Control circuitry 708 may compare the characters present in the segment with user profile data to determine whether the user likes the characters.

After factoring in the $N^{th}$ characteristic, at 914, control circuitry 708 determines whether N is equal to Tc, meaning that all characteristics have been factored in. If N is not equal to Tc ("No" at 914), then, at 916, control circuitry 708 increments the value of N by one and processing returns to 912. If N is equal to Tc ("Yes" at 914), or after setting the value of L equal to an importance level included in the metadata (908), at 918, control circuitry 708 accesses a user profile of the $U^{th}$ user. At 920, control circuitry 708 calculates, for the $U^{th}$ user, an engagement score for the $S^{th}$ segment based on the user profile. For example, control circuitry 708 may compare the various characteristics of the $S^{th}$ segment with user interests extracted, determined, or derived from user profile data to determine how often the $U^{th}$ user has engaged with similar content, how long the $U^{th}$ user remained engaged with that content, etc. Engagement scores may also be calculated using methods described below in connection with FIGS. 10 and 11.

At 922, control circuitry 708 determines an availability level of the $U^{th}$ user for the $S^{th}$ segment based on the importance level and the engagement score. For example, if the $S^{th}$ segment has a high importance level and the $U^{th}$ user has a high engagement score for the $S^{th}$ segment, control circuitry 708 will determine a low availability level, meaning that the user will be highly engaged with the $S^{th}$ segment and should not be interrupted during consumption of the $S^{th}$ segment. The availability level of the $U^{th}$ user may, as an example, be calculated as the difference of the highest availability level (100%) and an average of the importance level of the $S^{th}$ segment and the engagement score of the $U^{th}$ user for the $S^{th}$ segment. If the importance level of the $S^{th}$ segment is 80% and the engagement score of the $U^{th}$ user for the $S^{th}$ segment is 90%, the availability level may be calculated as 15%. However, if the engagement score for the same segment is only 30%, the availability level may be calculated as 45%. A higher availability level is calculated for lower engagement scores, lower importance levels, or both.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
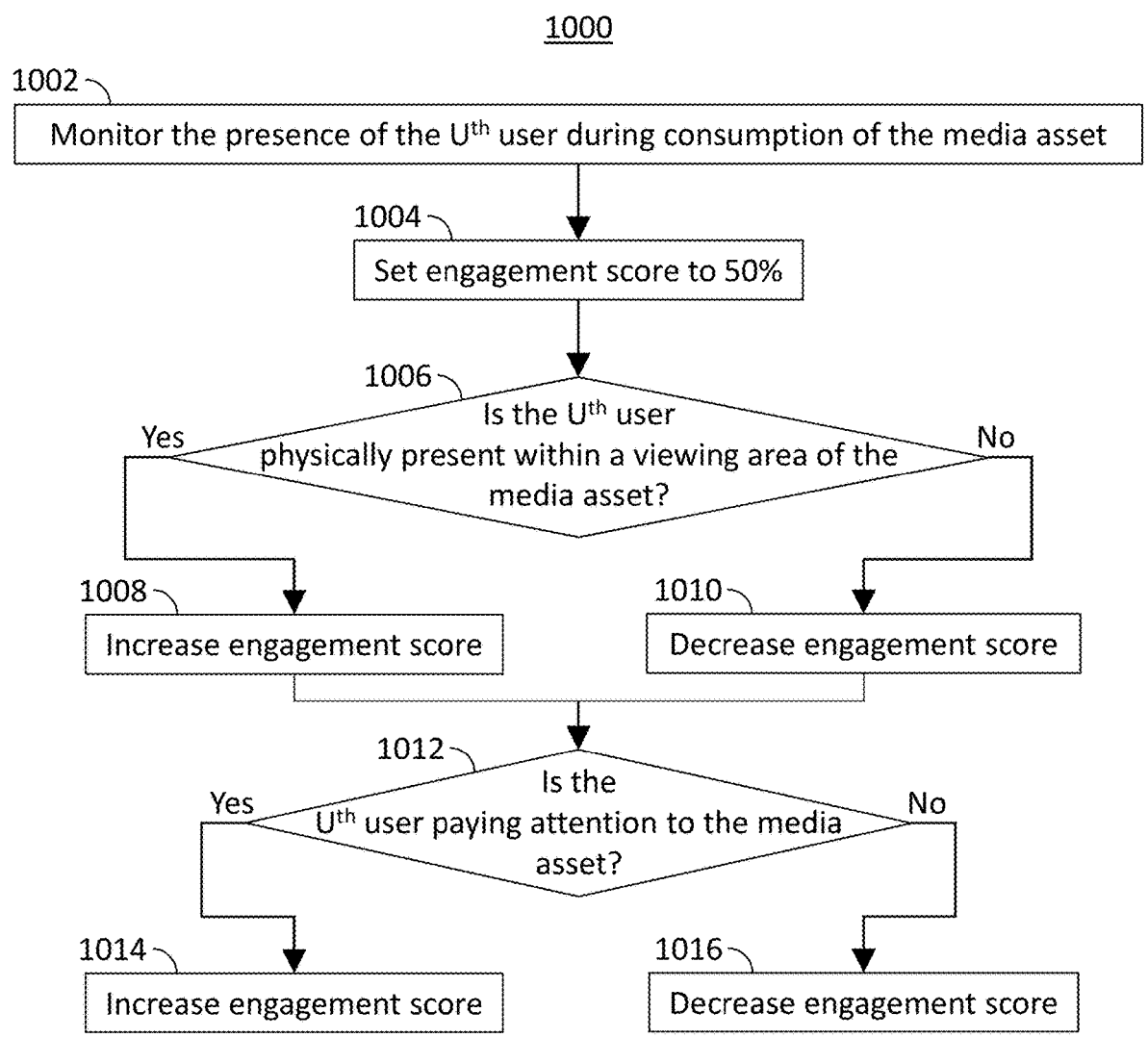
FIG. 10 is a flowchart representing a process for determining an engagement score of a user for a current segment of a media asset, in accordance with some embodiments of the disclosure.

FIG. 10 is a flowchart representing an illustrative process 1000 for determining an engagement score of a user for a current segment of a media asset, in accordance with some embodiments of the disclosure. Process 1000 may be implemented on control circuitry 708. In addition, one or more actions of process 1000 may be incorporated into or combined with one or more actions of any other process or embodiment described herein.

At 1002, control circuitry 708 monitors the presence of the $U^{th}$ user during consumption of the media asset. For example, control circuitry 708 may receive data captured by each user device representing the user's physical location relative to a display on which the user is consuming the content and/or the user's physiological parameters. Each user device may include a camera or other imaging sensor that captures the user in visible light, infrared light or other suitable wavelengths of light. Control circuitry 708 may process the captured image to determine any one or more of the position of the user relative to a display, the direction the user is facing, whether the user's eyes are open or closed, whether the user's gaze is turned toward the display, etc. Each user device may also include or communicate with one or more biometric sensors that monitor physiological parameters of the user, such as heart rate, brain activity, body temperature, etc. Control circuitry 708 may process the biometric readings captured from these sensors to determine the user's mental presence with regard to the media asset.

At 1004, control circuitry 708 sets a baseline engagement score of the $U^{th}$ user to 50%. At 1006, control circuitry 708 determines whether the user is physically present within a viewing area of the media asset. Control circuitry 708 may use images of the user captured by the user device to determine the user's physical location relative to a display on which the media asset is being consumed. Control circuitry 708 may also determine a type of the display device and calculate a viewing area of that device. If the user is within a threshold distance of the display device such that they are in the calculated viewing area, the threshold distance being calculated based on the viewing area of the device ("Yes" at 1006), then, at 1008, control circuitry 708 increases the engagement score of the user. The amount by which the engagement score is increased may depend on other factors such as how long the user has been detected as present. If the user is determined to be farther than a threshold distance from the display ("No" at 1006), then control circuitry 708 may determine that the user is not physically present and, at 1010, control circuitry 708 may lower the engagement score of the user by an amount corresponding to the distance beyond the threshold at which the user is located. For example, if the user is five feet beyond the threshold viewing area of a television, the engagement score may be lowered by 5%. However, if the user is five feet beyond the threshold viewing area of a tablet, the engagement score may be lowered by 50%.

At 1012, control circuitry 708 determines whether the $U^{th}$ user is paying attention to the media asset. For example, control circuitry 708 may process images captured by a user device to determine whether the user's gaze is toward the display device. Alternatively or additionally, control circuitry 708 may monitor activity on a device associated with the user such as a smartphone to determine whether the user is engaged in another activity on the device. If control circuitry 708 determines that the user is paying attention ("Yes" at 1012), then, at 1014, control circuitry 708 increases the engagement score. If the user is not paying attention ("No" at 1012), then, at 1016, control circuitry 708 decreases the engagement score. The amount by which the engagement score is adjusted in either direction may be based on other factors such as how long the user has or has not been paying attention to the media asset, or the type of activity the user is engaged with and a predicted duration of that activity.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

FIG. 11 is a flowchart representing an illustrative process 1100 for determining an engagement score of a user based on the presence of the user during segments of a media asset already consumed, in accordance with some embodiments of the disclosure. Process 1100 may be implemented on control circuitry 708. In addition, one or more actions of process 1100 may be incorporated into or combined with one or more actions of any other process or embodiment described herein.

At 1102, control circuitry 708 monitors the presence of the $U^{th}$ user during consumption of the media asset This may be accomplished using methods described above in connection with FIG. 10. At 1104, control circuitry 708 initializes a counter variable N, setting its value to one, a variable $C_S$, representing the number of segments of the media asset so far consumed by the $U^{th}$ user, and a counter variable T representing the number of segments so far consumed by the $U^{th}$ user to which the $U^{th}$ user paid attention. At 1106, control circuitry 708 determines whether the $U^{th}$ user was paying attention to the media asset during consumption of the $N^{th}$ segment. This may be accomplished using methods described above in connection with FIG. 10. If the $U^{th}$ user was paying attention during consumption of the $N^{th}$ segment ("Yes" at 1106), then, at 1108, control circuitry 708 increments the value of T by one.

After incrementing the value of T, or if the user was not paying attention during consumption of the $N^{th}$ segment ("No" at 1106), at 1110, control circuitry 708 determines whether N is equal to $C_S$, meaning that the user's attention has been analyzed for all segments so far consumed by the $U^{th}$ user. If N is not equal to $C_S$ ("No" at 1110), then, at 1112, control circuitry 708 increments the value of N by one and processing returns to 1106. If N is equal to $C_S$ ("Yes" at 1110) then, at 1114, control circuitry 708 calculates an engagement score for the $U^{th}$ user based on the value of T. For example, the engagement score may be calculated as a percentage of segments so far consumed to which the user paid attention. Thus, if the user paid attention to five segments out of ten segments consumed, the engagement score may be calculated as 50%.

The actions or descriptions of FIG. 11 may be used with any other embodiment of this disclosure. In addition, the actions and descriptions described in related to FIG. 11 may be done in suitable alternative orders or in parallel to further the purposes of this disclosure.

FIG. 12 is a flowchart representing an illustrative process 1200 for allowing or preventing delivery of a message based on a substantiveness threshold, in accordance with some embodiments of the disclosure. Process 1200 may be implemented on control circuitry 708. In addition, one or more actions of process 1200 may be incorporated into or combined with one or more actions of any other process or embodiment described herein.

At 1202, control circuitry 708 receives a message intended for delivery to the $U^{th}$ user. Messages sent by one user may be received by session controller 704 and processed by control circuitry 708 prior to allowing delivery to other users. At 1204, control circuitry 708 determines whether the content of the message is below a substantiveness threshold. For example, a message containing only greeting or farewell words (e.g., "hello," "hi," "goodbye," "bye," etc.) is not substantive. In contrast, a message containing a full sentence may be more substantive. Control circuitry 708 uses natural language processing to determine whether the content of the message is substantive. For example, a message determined to contain only a greeting, regardless of length, may not be considered substantive. However, a message determined to contain one or more complete sentences, or one or more complete ideas represented in sentence fragments, full sentences, and/or emojis may be considered substantive. The message may be assigned a substantiveness score, which is compared with a substantiveness threshold. If the content of the message is below the substantiveness threshold ("Yes" at 1204), then, at 1206, control circuitry 708 allows delivery of the message to the $U^{th}$ user. For example, control circuitry 708 may transmit an instruction or other message to session controller 704 to release the message for delivery to the $U^{th}$ user. If, on the other hand, the content of the message meets or exceeds the substantiveness threshold ("No" at 1204), then, at 1208, control circuitry 708 prevents deliver of the message to the $U^{th}$ user. For example, control circuitry 708 may transmit an instruction or other message to session controller 704 not to release the message for delivery to the $U^{th}$ user. Alternatively or additionally, control circuitry 708 may instruct session controller 704 to queue the message for delivery to the $U^{th}$ user until such time as the $U^{th}$ user's availability level increases.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
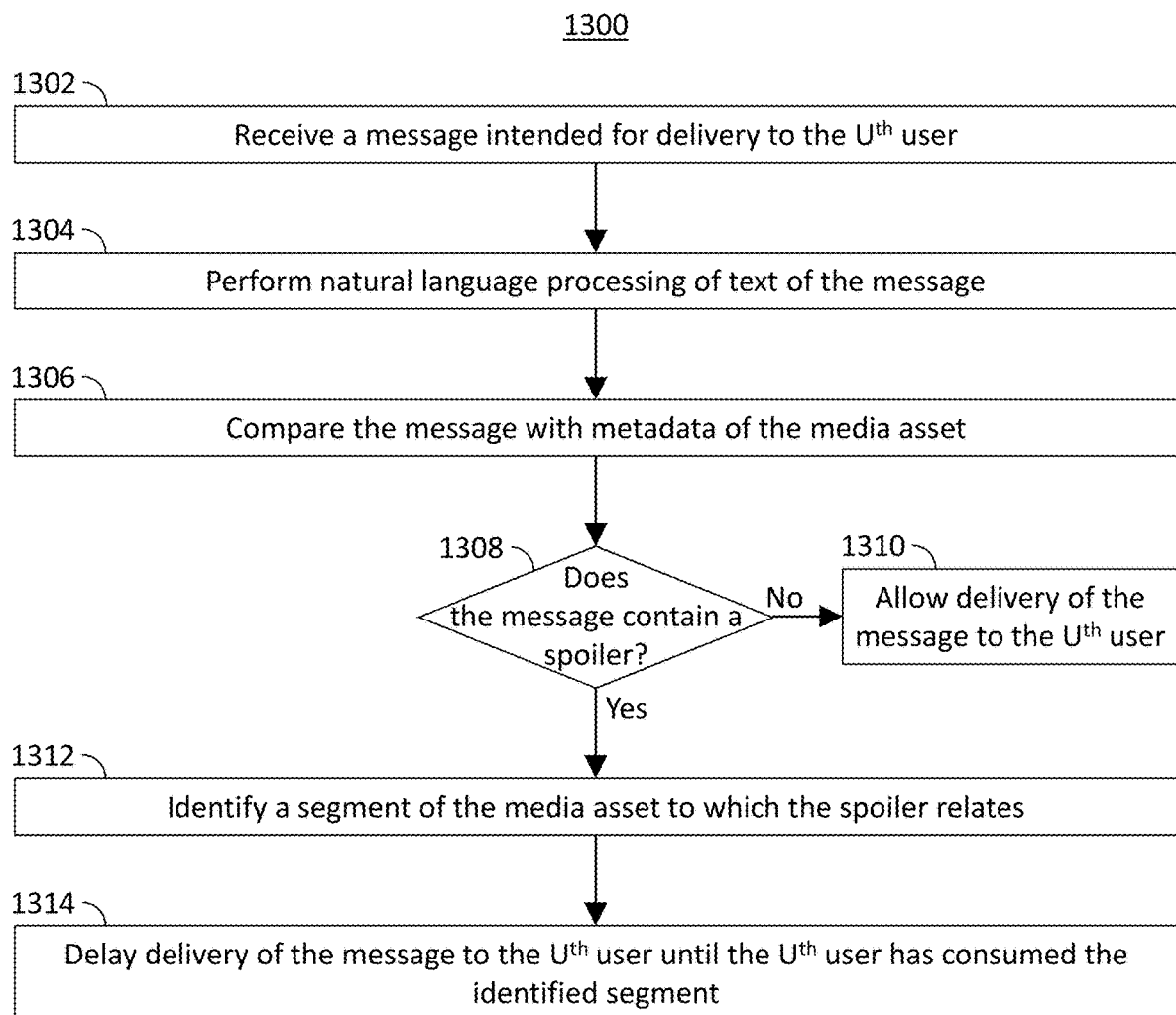
FIG. 13 is a flowchart representing a process for delaying delivery of a message containing a spoiler, in accordance with some embodiments of the disclosure.

FIG. 13 is a flowchart representing an illustrative process 1300 for delaying delivery of a message containing a spoiler, in accordance with some embodiments of the disclosure. Process 1300 may be implemented on control circuitry 708. In addition, one or more actions of process 1300 may be incorporated into or combined with one or more actions of any other process or embodiment described herein.

At 1302, control circuitry 708 receives a message intended for delivery to the $U^{th}$ user. While messages may normally be sent to every user other than the sending user, a user may choose to send a message directly to one user or to a subset of users within the group watch session. The message may contain metadata or header information listing one or more identifiers of users that are intended recipients of the message.

At 1304, control circuitry 708 performs natural language processing of the text of the message. Control circuitry 708 uses natural language processing to identify the content of the message. Natural language processing is used to identify parts of speech, idioms, and meanings of the message. For example, natural language processing identifies the message "wow" as an interjection that lacks any context information. Natural language processing identifies the message "I hope he makes it!" as a complete sentence expressing a desire for something to happen (based on the phrase "I hope") but lacking sufficient detail to describe the desired outcome. The message "Wait until you see the ending, it's so cool when Barry finally beats the bad guy!" is identified as containing two clauses. The first clause "Wait until you see the ending" is determined to express anticipation of something known to the author of the message but expected by the author to not yet be known to recipients of the message. The second clause "it's so cool when Barry finally beats the bad guy!" is determined to identify a specific event involving a character named "Barry" in which he "beats the bad guy." Such a message is flagged by control circuitry 708 as potentially containing a spoiler because it provides specific details regarding content not yet seen by all users.

In order to confirm that the message contains a spoiler and is not simply a message unrelated to the media that happens to resemble a spoiler, at 1306, control circuitry 708 compares the message with metadata of the media asset. Control circuitry 708 compares nouns with known actors and characters in the media asset, and verbs or descriptions with events that take place during the media asset. At 1308, control circuitry 708 determines, based on the comparison, whether the message contains a spoiler. For example, control circuitry 708 compares "Barry" with metadata of an episode of the television show "The Flash" being consumed in the group watch session and determines that "Barry" is the first name of the main character. Control circuitry 708 then compares any actions described in the message to events that occur the episode. If the metadata indicates that the same or similar events occur in the media asset, control circuitry 708 determines that the message contains a spoiler.

If the message does not contain a spoiler ("No" at 1308), then, at 1310, control circuitry 708 allows delivery of the message to the $U^{th}$ user. For example, control circuitry 708 may transmit an instruction or other message to session controller 704 to release the message for delivery to the $U^{th}$ user. If the message does contain a spoiler ("Yes" at 1308), then, at 1312, control circuitry 708 identifies a segment of the media asset to which the spoiler relates. For example, control circuitry 708 may identify an event referenced in the message and search the metadata for that event. The metadata may list the event in association with one or more segments of the content. To ensure that users do not receive spoilers until the user has consumed the entire event, control circuitry 708 may identify the last segment associated with the event as the segment to which the spoiler relates.

At 1314, control circuitry 708 delays delivery of the message to the $U^{th}$ user until the $U^{th}$ user has consumed the identified segment. Control circuitry 708 may instruct session controller 704 to deliver the message to the $U^{th}$ user at a specific time, or may schedule an instruction to release the message for delivery to the $U^{th}$ user to be sent to session controller 704 at a specific time. The specific time may be calculated based on the time required from the $U^{th}$ user's current playback position within the media asset to reach the end of the identified segment. Alternatively, control circuitry 708 may monitor consumption of the media asset by the $U^{th}$ user and instruct session controller 704 to release the message for delivery to the $U^{th}$ user when control circuitry 708 detects that the $U^{th}$ user has consumed the identified segment.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

In some embodiments, after instructing a user device to disable a feature of a chat application on the user device, an input may be received from the user to manually reactive the disabled chat feature. For example, an instruction may be sent to the user device to hide or minimize a chat window and a subsequent user input may be received to reopen the chat window while the user's availability level is still below the threshold. An indication of the user input may be transmitted to control circuitry 708. In response, control circuitry 708 may update the user's availability level. The amount by which the user's availability level is adjusted may correspond to the amount by which the calculated availability level falls below the threshold availability level. For example, if the user's availability level is calculated to be 15% and the threshold availability level is 30%, control circuitry 708 may adjust the user's availability level to be 40%. If the user's availability level is calculated to be 10% or less, control circuitry 708 may adjust the user's availability level to be just above the threshold availability level (e.g., 31%). Alternatively or additionally, control circuitry 708 may update the user profile of the user based on the received input to reactivate the disabled feature. Control circuitry 708 may, in some embodiments, perform this action first and subsequently recalculate the user's availability level based on the updated user profile data.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

In addition, the systems and methods described herein may be performed in real time. It should also be noted that the systems and/or methods described above may be applied to, or used in accordance with, other systems and/or methods.

What is claimed is:

1. A method for automatically enabling or disabling at least one function of a chat application for at least one user during a group watch session, the method comprising:
   identifying a plurality of users in the group watch session;
   identifying a media asset being consumed by the plurality of users, the media asset comprising a plurality of segments; and
   for each respective segment of the plurality of segments:
   determining, for each respective user of the plurality of users, an availability level of the respective user for the respective segment;
   in response to determining that the availability level of the respective user for the respective segment is below a threshold level, disabling, on a device associated with the respective user, at least one function of a chat application during consumption, by the respective user, of the respective segment; and
   in response to determining that the availability level of the respective user for the respective segment meets or exceeds the threshold level, enabling, on the device associated with the respective user, the at least one function of the chat application during consumption, by the respective user, of the respective segment.

2. The method of claim 1, wherein determining, for each respective user of the plurality of users, an availability level of the respective user for the respective segment comprises:
   identifying, from metadata associated with the media asset, at least one characteristic of the respective segment;
   determining, based on the metadata, an importance level of the respective segment;
   accessing a user profile of the respective user;
   calculating, for the respective user, an engagement score for the respective segment based on the user profile; and
   determining an availability level of the respective user for the respective segment based on the importance level and the engagement score.

3. The method of claim 2, wherein calculating, for the respective user, an engagement score comprises:
   monitoring the presence of the respective user during consumption of the respective segment; and
   determining, based on the presence of the respective user, the engagement score.

4. The method of claim 2, wherein calculating, for the respective user, an engagement score comprises:
   monitoring the presence of the respective user during consumption of the media asset;
   determining a number of segments of the media asset for which the respective user has been present; and
   calculating the engagement score based on the number of segments of the media asset for which the respective user has been present.

5. The method of claim 1, wherein disabling, on a device associated with the respective user, at least one function of the chat application comprises transmitting, to the device, an instruction to hide a chat window.

6. The method of claim 1, wherein disabling, on a device associated with the respective user, at least one function of the chat application comprises queuing the messages for delivery to the respective user when the availability level of the respective user meets or exceeds the threshold.

7. The method of claim 1, wherein disabling, on a device associated with the respective user, at least one function of a chat application comprises limiting delivery, to the respective of user, of messages in the chat application to messages below a substantiveness threshold.

8. The method of claim 1, wherein disabling, on a device associated with the respective user, at least one function of a chat application comprises:
   performing natural language processing of text of a message received by a first user from a second user;
   determining, based on the natural language processing, that the message contains a spoiler;
   identifying a segment of the media asset to which the spoiler relates; and
   delaying delivery of the message until the first user has consumed the identified segment.

9. The method of claim 1, further comprising generating for display a visual indicator showing that a respective user of the plurality of users is not available, the visual indicator being overlaid on a progress bar in a region of the progress bar corresponding to a segment during which at least one function of the chat application is disabled for the respective user.

10. The method of claim 1, further comprising generating for display a representation of a respective user of the plurality of users and an icon overlaid on the representation of the respective user corresponding to whether at least one function of the chat application is currently disabled or enabled for the respective user.

11. A system for automatically enabling or disabling at least one function of a chat application for at least one user during a group watch session, the system comprising:
    a session controller; and
    control circuitry configured to:
    identify, using the session controller, a plurality of users in the group watch session;
    identify, using the session controller, a media asset being consumed by the plurality of users, the media asset comprising a plurality of segments; and
    for each respective segment of the plurality of segments:
    determine, for each respective user of the plurality of users, an availability level of the respective user for the respective segment;
    in response to determining that the availability level of the respective user for the respective segment is below a threshold level, disable, on a device associated with the respective user, at least one function of a chat application during consumption, by the respective user, of the respective segment; and
    in response to determining that the availability level of the respective user for the respective segment meets or exceeds the threshold, enable, on the device associated with the respective user, the at least one function of the chat application during consumption, by the respective user, of the respective segment.

12. The system of claim 11, wherein the control circuitry configured to determine, for each respective user of the plurality of users, an availability level of the respective user for the respective segment is further configured to:
    identify, from metadata associated with the media asset, at least one characteristic of the respective segment;
    determine, based on the metadata, an importance level of the respective segment;
    access a user profile of the respective user;
    calculate, for the respective user, an engagement score for the respective segment based on the user profile; and determine an availability level based on the importance level, and the engagement score.

13. The system of claim 12, wherein the control circuitry configured to calculate, for the respective user, an engagement score is further configured to:
    monitor the presence of the respective user during consumption of the respective segment; and
    determine, based on the presence of the respective user, the engagement score.

14. The system of claim 12, wherein the control circuitry configured to calculate, for the respective user, an engagement score is further configured to:
    monitor the presence of the respective user during consumption of the media asset;
    determine a number of segments of the media asset for which the respective user has been present; and
    calculate, based on the number of segments of the media asset for which the respective user has been present, the engagement score.

15. The system of claim 11, wherein the control circuitry configured to disable, on a device associated with the respective user, at least one function of the chat application is further configured to transmit, to the device, an instruction to hide a chat window.

16. The system of claim 11, wherein the control circuitry configured to disable, on a device associated with the respective user, at least one function of the chat application is further configured to queue the messages for delivery to the respective user when the availability level of the respective user meets or exceeds the threshold.

17. The system of claim 11, wherein the control circuitry configured to disable, on a device associated with the respective user, at least one function of a chat application is further configured to limit delivery, to the respective of user, of messages in the chat application to messages below a substantiveness threshold.

18. The system of claim 11, wherein the control circuitry configured to disable, on a device associated with the respective user, at least one function of a chat application is further configured to:
    perform natural language processing of text of a message received by a first user from a second user;
    determine, based on the natural language processing, that the message contains a spoiler;
    identify a segment of the media asset to which the spoiler relates; and
    delay delivery of the message until the first user has consumed the identified segment.

19. The system of claim 11, wherein the control circuitry is further configured to generate for display a visual indicator showing that a respective user of the plurality of users is not available, the visual indicator being overlaid on a progress bar in a region of the progress bar corresponding to a segment during which at least one function of the chat application is disabled for the respective user.

20. The system of claim 11, wherein the control circuitry is further configured to generate for display a representation of a respective user of the plurality of users and an icon overlaid on the representation of the respective user corresponding to whether at least one function of the chat application is currently disabled or enabled for the respective user.

* * * * *

UNITED STATES PATENT AND TRADEMARK OFFICE
CERTIFICATE OF CORRECTION

PATENT NO. : 11,432,047 B1
APPLICATION NO. : 17/518795
DATED : August 30, 2022
INVENTOR(S) : Vishwas Sharadanagar Panchaksharaiah et al.

It is certified that error appears in the above-identified patent and that said Letters Patent is hereby corrected as shown below:

In the Claims

Claim 7, Column 22, Line 4, delete "of"

Claim 17, Column 24, Line 3, delete "of"

Signed and Sealed this
Twenty-fifth Day of October, 2022

Katherine Kelly Vidal
*Director of the United States Patent and Trademark Office*